United States Patent [19]

Rund et al.

[11] Patent Number: 5,381,295

[45] Date of Patent: Jan. 10, 1995

[54] RESETABLE BATTERY DRAIN LIMITATION CIRCUIT WITH IMPROVED LATCHING RELAY

[75] Inventors: Larry Rund, Idyllwild; Richard P. Hewitt, Romoland; Stuart Sigafoos, Perris, all of Calif.

[73] Assignee: Datamax Electronics, Inc., Romoland, Calif.

[21] Appl. No.: 912,800

[22] Filed: Jul. 14, 1992

Related U.S. Application Data

[63] Continuation-in-part of Ser. No. 806,867, Dec. 12, 1991.

[51] Int. Cl.$^6$ .......................... H02H 7/00; B60L 1/00
[52] U.S. Cl. ........................................ 361/92; 361/71; 361/72; 361/115
[58] Field of Search .................. 361/79, 92, 94, 71, 361/72, 115; 320/13, 48; 307/10; 324/107; 335/165, 170, 177, 254; 200/98

[56] References Cited

U.S. PATENT DOCUMENTS

| | | | |
|---|---|---|---|
| Re. 32,793 | 11/1988 | Baker et al. | 335/170 |
| 1,014,300 | 1/1912 | Hart | 335/177 |
| 1,071,737 | 9/1913 | Hart | 361/94 |
| 1,103,199 | 7/1914 | Hart | 335/177 |
| 1,326,359 | 12/1919 | Mahoney | 335/254 |
| 2,632,821 | 3/1953 | Wright et al. | 200/98 |
| 3,101,434 | 8/1963 | Kitscha | 317/187 |
| 3,235,777 | 2/1966 | Hatashita | 317/187 |
| 3,462,647 | 8/1969 | Russell | 317/31 |
| 3,474,296 | 10/1969 | Rickey | 317/31 |
| 3,503,021 | 3/1970 | De Bruin et al. | 335/254 |
| 3,522,481 | 3/1968 | Terzic | 317/31 |
| 3,571,707 | 3/1971 | Houck | 324/107 |
| 3,623,131 | 11/1971 | Russell | 307/10 |
| 3,646,354 | 2/1972 | Von Brimer | 307/10 |
| 3,648,145 | 3/1972 | Meyer et al. | 320/13 |
| 3,656,045 | 4/1972 | Frezzolini et al. | 320/34 |
| 3,893,053 | 7/1975 | Onatsevich | 335/254 |
| 4,005,344 | 1/1977 | Gaird et al. | 317/31 |
| 4,137,557 | 1/1979 | Ciamiello et al. | 361/92 |
| 4,218,717 | 8/1980 | Shuster | 361/79 |
| 4,313,079 | 1/1982 | Lee | 320/48 |
| 4,412,267 | 10/1983 | Hansen | 361/94 |
| 4,493,001 | 1/1985 | Sheldrake | 361/92 |
| 4,682,289 | 12/1986 | Huber | 335/168 |
| 4,902,956 | 2/1990 | Sloan | 320/13 |
| 4,950,913 | 8/1990 | Kephart | 307/10.7 |

FOREIGN PATENT DOCUMENTS

1035771  8/1958  Germany ...................... H01D 7/08

*Primary Examiner*—Marc S. Hoff
*Assistant Examiner*—S. Jackson
*Attorney, Agent, or Firm*—Klein & Szekeres

[57] ABSTRACT

A battery drain limitation circuit, for use in engine-powered vehicles and equipment that rely on a battery for starting the engine and for operating accessories, disconnects the battery from all loads when the battery voltage falls to a level below which the battery charge may be insufficient to start the engine. The circuit is rendered inoperable, when the engine is running, by means of a microphone that detects engine noise. The circuit includes a reset mechanism that reconnects the battery to all loads. The reset mechanism may be automatic or manually actuated. A timing circuit delays the disconnection for a period of time sufficient to start the engine. The drain limitation circuit employs a latching relay that, in its preferred embodiment, includes front and rear coils in tandem, axially separated by a collar with an internal detent. A front plunger and a rear plunger are disposed for axial movement within the coils and the collar. The front plunger is provided with a contact actuation arm, and with latching elements that engage the detent when the plungers move in a first direction in response to the energization of the front coil, thereby latching the actuation arm in a position in which it closes the relay's contacts. The latching elements are disengaged from the detent when the plungers move in the opposite direction in response to the energization of the rear coil, allowing the actuation arm to move to a position in which it opens the contacts.

50 Claims, 4 Drawing Sheets

RESETABLE BATTERY DRAIN LIMITATION CIRCUIT WITH IMPROVED LATCHING RELAY

CROSS-REFERENCE TO RELATED APPLICATION

This application is a continuation-in-part of co-pending application Ser. No. 07/806,867; filed Dec. 12, 1991.

FIELD OF THE INVENTION

The present invention generally relates to battery protection devices and, more particularly, to such devices for use in engine powered vehicles and equipment which rely upon a battery to start the engine.

DESCRIPTION OF THE PRIOR ART

The battery used to start the engine in engine powered vehicles and equipment may be drained by the operation of associated electrical apparatus or by short circuits. The problem of preserving sufficient charge in the battery so that it is usable to start the engine has been variously resolved in the art. Common to such resolutions is the objective of detecting a battery discharge condition beyond which the battery may not be able to start the engine, and the objective of then interrupting further drain upon the battery, except when the engine is running.

U.S. Pat. No. 3,462,647 to Russell discloses a circuit and apparatus for achieving these objectives using relay coils. A distinguishing feature of the Russell device is that the protective circuit is active only when the ignition switch was off and some accessory operable without the ignition key was drawing power. Thus there would be no protection against a circuit drain in the ignition system. The present invention connects directly to the battery and covers all loads, including the ignition system and starter motor, with the protective circuit. Furthermore, this approach makes for a device which is very simple to install in existing vehicles and equipment.

U.S. Pat. No. 4,493,001 to Sheldrake discloses a circuit and apparatus which, in addition to achieving the above objectives, inhibits circuit disconnection caused by battery voltage drops incident to entry of the vehicle. Sheldrake accomplishes this objective by adding circuitry designed to detect battery voltage drops characteristic of vehicle entry. The present invention adopts a simpler approach, delaying disconnection for a period long enough to allow starting of the engine.

More recently, U.S. Pat. No. 4,902,956 to Sloan discloses several embodiments which accomplish the above described objectives. In some embodiments of Sloan the starter motor is not included in the loads covered by the protective circuit, thus allowing battery drain from a short in the ignition circuitry. In the embodiment of the Sloan invention most comparable to the present invention, where all loads including the starter motor are covered by the protective circuit, it is necessary to bypass the protective circuit with a manual override switch in order to engage the starter motor after the protective device has disconnected the circuit. This is disadvantageous because the override switch may be left on inadvertently for an indefinite time.

U.S. Pat. No. 4,950,913 to Kephart discloses a circuit and apparatus for achieving these objectives. A distinguishing feature of the Kephart device is that it does not protect the battery against excessive current drain in the starter motor or shorts in the ignition system. Further, the Kephart device employs an unconditional manual bypass in order to allow operation of electrical equipment in an emergency. This bypass may be left on, leading to unnecessary damage of the battery and making the device unsuitable for permanent installation in the vehicle.

Under the present invention there are no bypasses to the protective circuit. There is instead a unitary reset mechanism which simply reestablishes both the protective device and the connection between the battery and the load. Instead of a bypass to permit use of the ignition system or use of accessories regarded as critical, the present invention adopts a simple and uniformly applied alternative: the battery is not disconnected until after a predetermined delay which is long enough to allow restarting the engine. Furthermore, since all battery loads (except those reset components necessary to reconnect the battery) are connected to the protective circuit, the same reset mechanism is usable at the initiative of the operator, when the engine is not running, to allow emergency operation of any accessory for a limited time period.

SUMMARY OF THE INVENTION

It is therefore an object of the present invention to provide a battery drain limitation device that provides protection from a "dead battery" condition when there is a faulty short circuit condition or when accessories are left in an operative condition after the engine is turned off.

It is a further object of the invention to detect a battery discharge condition beyond which the battery may not be able to start the engine, and then to interrupt further drain upon the battery, except when the engine is running.

It is another object of the present invention to provide a protective device that is simple to install on existing vehicles and equipment by an end user.

It is a still another object of the invention to have a reset mechanism which beth resets the protective device and reconnects the battery to all loads.

It is a further object of the present invention to delay operation of the protective device after resetting for a time period long enough to allow the engine to be started.

The device according to the invention senses when the battery voltage drops below a voltage level still usable for starting the engine, and then after a set delay period automatically disconnects the entire circuit at the battery, except for those reset components necessary to reconnect the circuit. When the engine is running this operation of the device is disabled by a circuit which detects engine noise. If a power drain is present and the protective device has disconnected the battery source, a reset mechanism can be used to reconnect the battery and restore the protective device to operation. If the reset mechanism is so used, it will be seen that the set delay period allows sufficient time to start the engine under most all conditions.

The present invention also includes a novel latching relay, comprising a cylindrical body or housing containing front and rear coils in tandem, axially separated by a tubular collar. The coils and the collar are held within the housing by front and rear end plates. The portion of the collar proximate the front coil defines an opening with an enlarged internal diameter, and this front portion of the collar forms an internal shoulder where it joins the main portion of the collar.

A front plunger, spring-biased away from the front end plate, and a rear plunger, spring-biased away from the rear end plate, are slidably disposed within the coil and collar assemblies. The front plunger includes an actuation arm that extends through an aperture in the front end plate. A plurality of latching balls are circumferentially disposed around an axial cavity in the posterior end of the front plunger, so as to be radially displaceable into and out of the opening at the front portion of the collar. The latching balls are radially displaced outward into the opening by a frustoconical camming surface on an extension member extending from the anterior end of the rear plunger, the extension member being axially movable into the posterior cavity in the front plunger as the rear plunger is moved toward the front plunger.

In operation, applying current to the front coil draws the front plunger toward the front plate against the bias of its associated biasing spring. The rear plunger is spring-biased toward the front plunger, so that its anterior extension enters the posterior cavity of the front plunger, the conical camming surface thereof forcing the latching balls radially outward into the opening at the front of the collar. In this position, the latching balls engage the internal shoulder of the collar, locking the front plunger in its extended position, with its actuation arm fully extended through the aperture in the front end plate.

Applying a current to the rear coil withdraws tip of the rear plunger from the posterior cavity of the front plunger, allowing the latching balls to return radially to their original positions in the front plunger. The biasing spring of the front plunger can thus urge the front plunger rearward, toward the rear plunger, thereby withdrawing the actuation arm through the front end plate aperture to its withdrawn position.

The rear end plate includes a central aperture through which a manual actuation rod can be inserted to move the rear plunger tip into the front plunger cavity, thereby moving the latching balls into their locking engagement with the collar shoulder. In this manner, the relay can be manually moved to its extended position, without energizing the front coil.

DETAILED DESCRIPTION OF THE PREFERRED EMBODIMENTS

Figure 1:
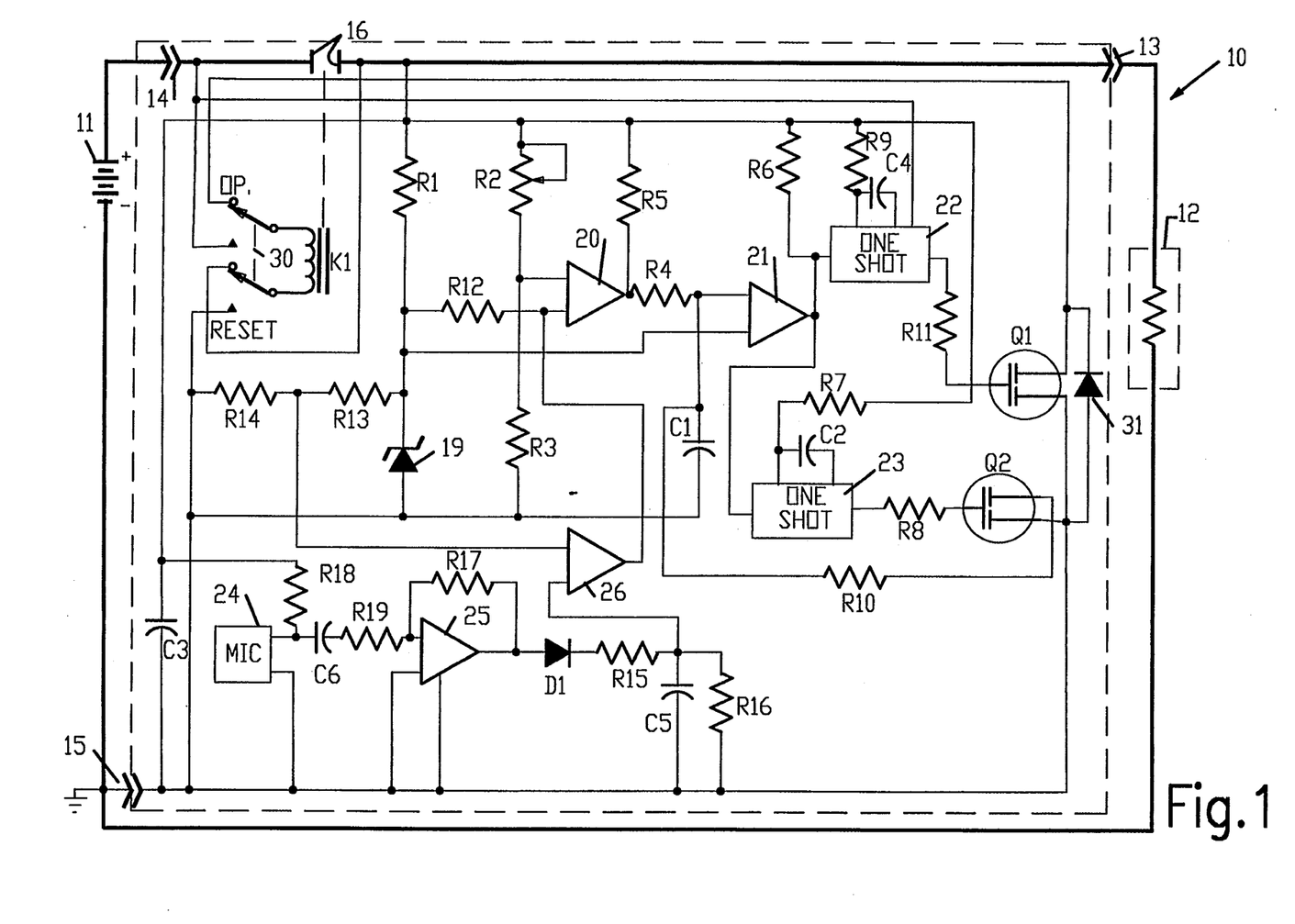
FIG. 1 is a schematic diagram of a battery drain limitation circuit in accordance with a first preferred embodiment of the invention.

Referring now to the schematic diagrams, and more particularly to FIG. 1, there is shown a battery drain limitation device 10 attached between, for example, an automobile battery 11 and a vehicle load 12. The load 12, while shown as a single resistive load, is in fact composed of a plurality of loads including, for example, head lights, running and indicator lights, starter motor, and various accessories such as a radio.

For any particular vehicle or equipment having a battery operated starter motor and an engine, when the electrical characteristics of the battery are considered in light of the power required by the starter motor to start the engine under anticipated operating conditions, there will be a threshold battery voltage at which the battery charge is sufficient to start the engine and below which the battery charge may not be sufficient to start the engine. By way of example only, and not as a limitation, this threshold voltage (hereinafter "threshold voltage level") will be taken to be 11.3 volts for a standard 12 volt automobile battery in a typical automobile.

The battery drain limitation device 10 is easily installed by the user of the vehicle via terminals 13, 14 and 15. More specifically, the positive cable is removed from the positive post of the battery 11, and the terminal 14 is attached to the positive post. Then, the positive cable is attached to the terminal 13. Finally, the terminal 15 is attached to ground, which connection may be made by a cable end connector (not shown) to the negative post of the battery 11, or to any ground point on the vehicle or equipment via a ground wire.

Turning now to the specific circuitry of the battery drain limitation device 10, a latching relay, comprising a coil K1 and contacts 16, is latched closed during normal circuit operation by means of a reset mechanism described in greater detail below. This establishes a current path to the vehicle load 12 through the terminal 13 and to the operative circuitry of the present invention 10.

A Zener diode 19 is selected with an appropriate breakdown voltage (hereinafter "stable reference voltage") which must be less than the threshold voltage level. By way of example rather than as a limitation, where the battery 11 is a standard 12 volt automobile battery in a typical automobile, this stable reference voltage will be taken as 6.2 volts. A voltage divider comprises resistors $R_1$, $R_{13}$ and $R_{14}$, the values of which are selected so that the current drain through $R_1$ is small and the voltage at the cathode of the Zener diode 19 is above the stable reference voltage even when the battery voltage drops below the threshold voltage level. Under these conditions, the voltage at a cathode of the Zener diode 19 will remain at the stable reference voltage.

This stable reference voltage is supplied to first and second voltage comparators, 20 and 21, which are contained on a first integrated circuit (IC). The stable reference voltage is supplied to a lower input to the first comparator 20 via a resistor $R_{12}$, and is supplied directly to a lower input to the second comparator 21. The purpose of the resistor $R_{12}$ will become apparent from the following description.

A second, measuring voltage divider comprises a variable resistor $R_2$ and a fixed resistor $R_3$. The variable resistor $R_2$ is adjusted so that an upper input to the first comparator 20 is a predefined function of the battery voltage. This adjustment is such that when the voltage across the battery terminals drops below the threshold voltage level, the voltage at the upper input of first comparator 20 is slightly less than the stable reference voltage. This condition is sensed by the first comparator 20 causing it to change state.

The output signal from the first comparator 20 is delayed through a timing circuit, comprising a resistor $R_4$ and a capacitor $C_1$. During normal operation the output of first comparator 20 will be low, leaving the capacitor $C_1$ uncharged. When the voltage across the battery 11 drops below the threshold voltage level, the first comparator 20 changes state, charging the capacitor $C_1$ through the resistor $R_4$ with a time constant which is long enough to allow starting of the engine under most all conditions. By way of example only, rather than as a limitation, this time constant is about 15 minutes. In this length of time, when the engine is not running, battery drain from loads other than the starter motor will not significantly deplete the battery power required to start the engine. When the voltage across the capacitor $C_1$ reaches the stable reference voltage, the output of the second comparator 21 changes state, triggering first and second one-shots 22 and 23. These one-shots are contained on a second IC.

The first one-shot 22 generates an output to the gate of first field effect transistor (FET) $Q_1$ via a resistor $R_{11}$, thereby turning on the first FET $Q_1$, while the second one-shot 23 generates an output to the gate of a second FET $Q_2$ via a resistor $R_8$, thereby turning on the second FET $Q_2$. The conduction of the first FET $Q_1$ sends a reverse current through the relay coil K1 for about 500 milliseconds, causing the relay contacts 16 to open, effectively disconnecting the battery 11 from the load 12. The conduction of the second FET $Q_2$ shorts capacitor $C_1$ to ground through a resistor $R_{10}$, resetting the timing circuit.

If the engine is running, the battery drain limitation device 10 does not disconnect the battery 11 from the load 12, even if the voltage across the battery 11 falls to less than the threshold voltage level because of an emergency condition such as a broken alternator belt or other electrical failure. This allows the vehicle to be operated until a repair facility can be reached. The running condition of the engine is detected with a microphone 24. The noise level at the battery drain limitation device 10 will be at a low value when the engine is not running and a high value when the engine is running. The difference between the low value and the high value is very large and an engine noise detection level may be selected within this range. By way of example, rather than as a limitation, the engine noise detection level for a typical engine in a typical automobile will be taken to be approximately 75 db. The noise signal from the microphone 24 is fed via a coupling capacitor $C_6$ and a series resistor $R_{19}$ to a high gain amplifier 25, in the form of a third IC. The output of the amplifier 25 is rectified by diode $D_1$, and smoothed by a low pass filter comprising resistors $R_{15}$ and $R_{16}$ and a capacitor $C_5$.

When the engine is not running, the noise signal from the microphone 24 will be well below the engine noise detection level and the output of a third voltage comparator 26, on the first IC, will be high, allowing the first comparator 20 to sense the voltage of the battery 11 and change state if the voltage drops below the threshold level. Noise at the battery drain limitation device 10 which is above the engine noise detection level will generate a voltage at the output of the low pass filter sufficient to flip the third comparator 26 to a low state. A stable reference voltage corresponding to this noise level is established by a voltage divider comprising the resisters $R_{13}$ and $R_{14}$ connected across the stable reference voltage of the Zener diode 19. The output of the third comparator 26 is connected directly to the reference input of the first comparator 20, and is separated from the stable reference voltage of the Zener diode 19 by the resistor $R_{12}$. The resistor $R_{12}$ thus isolates the stable reference voltage from the output state of the third comparator 26. Therefore, when the third comparator 26 is in a low state, this low output state will keep the first comparator 20 from changing state, thus disabling the protective feature of the battery drain limitation device 10.

A reset means are provided for latching the relay contacts 16 in the closed position. In the embodiment shown in FIG. 1, the reset circuitry comprises a DPDT switch 30 and a protective diode 31. The switch 30 has an operating position and a button operated momentary reset position. In the operating position (the position shown in FIG. 1), a current path is provided across the battery 11, such that if the first FET $Q_1$ is "on", a reverse current will flow through the coil K1, opening the relay contacts 16. In the reset position, a current path is provided directly across the battery through the coil K1. When the switch 30 is manually switched to the reset position by means of the reset button, current flows through the coil K1, causing the relay contacts 16 to latch in the closed position. When the reset button is released and switch 30 returns to the operating position, a diode 31 connected across the first FET $Q_1$ protects the vehicle's electronics from the back EMF of the collapsing field of the coil K1.

The switch 30 and reset button can either be on the module at the battery, or at a remote location within the cab of the vehicle. Pressing the reset button allows the operator a predetermined time period for starting the engine. This time period is determined by a time constant of the resistor $R_4$ and the capacitor $C_1$. More specifically, assuming that the voltage of the battery 11 is below the threshold voltage level, this will be sensed immediately by the first comparator 20 when the reset button is pressed, causing the first comparator 20 to flip from a low state to a high state. However, the output of the first comparator 20 does not immediately cause the second comparator 21 to flip. Rather, the capacitor $C_1$ slowly charges through the resistor $R_4$. During this time period (about fifteen minutes), the operator can attempt to start the engine, and if successful, the third comparator 26 will flip from a high state to a low state as described above. The low output from the third comparator 26 causes the first comparator 20 to flip back to a low state, providing a discharge path for the capacitor $C_1$ via the resistor $R_4$, thus preventing the voltage across the capacitor $C_1$ from reaching the level which would flip the output of the second comparator 21.

In order to minimize drain on the battery after the device detects a low power condition, power to all active circuits of the device except first one-shot 22 is cut off at the same time that other vehicle loads 12 are disconnected. This is accomplished by connecting the power for these circuits to be vehicle load 12 side of the relay contacts 16. However, if first one-shot 22 were powered in this fashion (connected to the load side) it would trigger every time the battery drain limitation device 10 is reset, thus turning on the first FET $Q_1$ and sending a reverse current through the coil K1, resulting in false operation of the battery drain limitation device 10. Consequently, if first one-shot 22 receives its power directly from the battery 11 through the positive terminal 14, the device 10 draws minimal current under disconnect conditions. Thus, first one-shot 22 will trigger upon initial connection to the battery 11, disconnecting the load from the battery until the battery drain limitation device 10 is reset.

Figure 2:
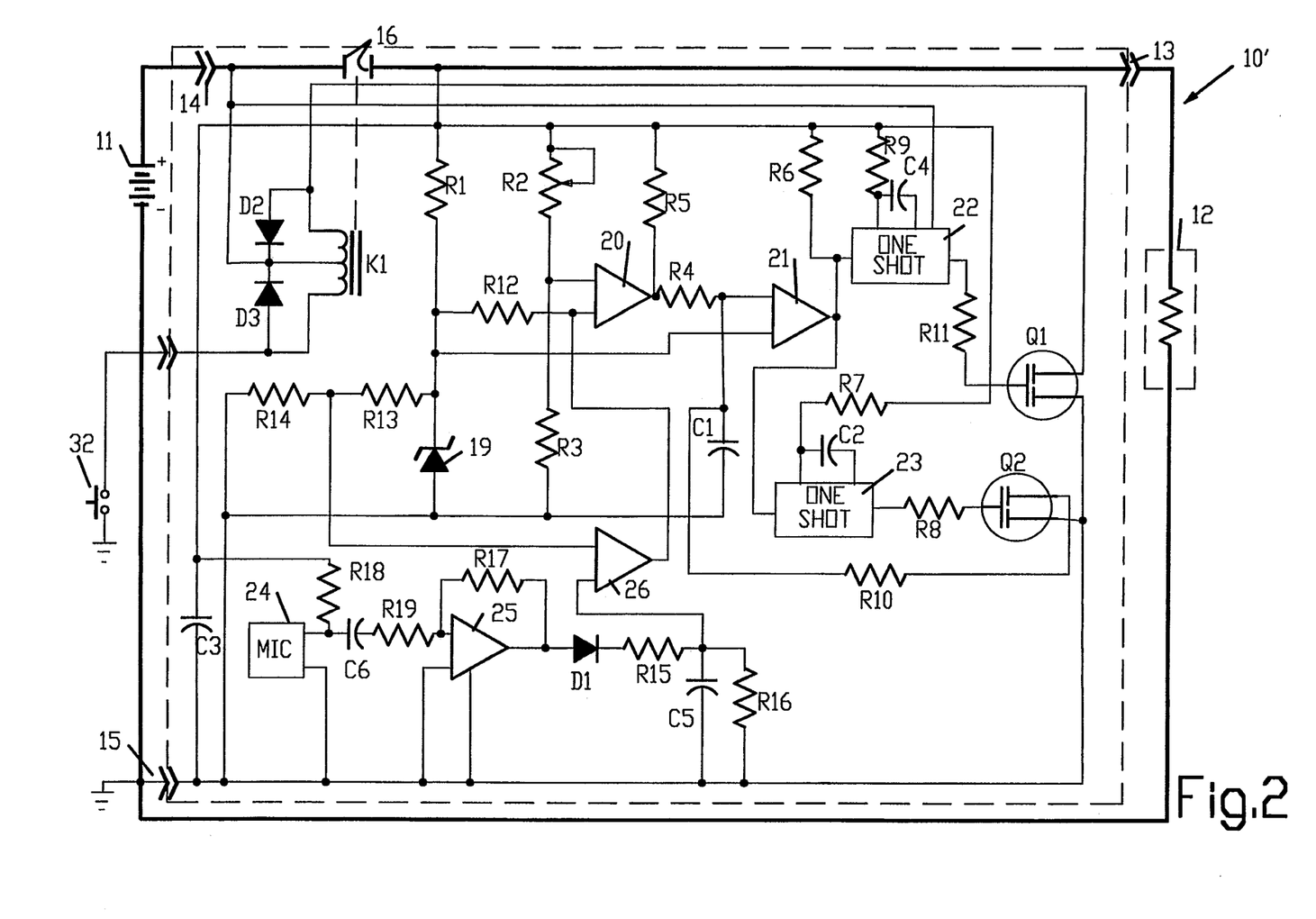
FIG. 2 is a schematic diagram of a battery drain limitation circuit in accordance with a second preferred embodiment of the invention.

A second embodiment 10 of the invention is shown in FIG. 2, wherein like reference numerals and symbols designate the same or similar components as shown in FIG. 1. In the FIG. 2 embodiment, the reset circuitry comprises a center tap on the relay coil K1, diodes $D_2$ and $D_3$, and a momentary reset button 32.

The center tap on the relay coil K1 is connected to the positive terminal 14 and to the cathodes of the diodes $D_2$ and $D_3$. The anodes of the diodes $D_2$ and $D_3$ are connected to opposite ends of the coil K1. In normal operation of device 10 a current path is provided across the battery 11 such that when the first FET $Q_1$ is "on" a reverse current will flow through a first half of the coil K1, opening the relay contacts 16. When the reset button 32 is pushed, current flows through a second half of the coil K1 causing the relay contacts 16 to latch in the closed position. The diodes $D_2$ and $D_3$ protect vehicle electronics against the back EMF of the collapsing field of the coil K1. Because power is continuously supplied to the first one-shot 22 directly from the battery 11, resetting the device will not trigger the first one-shot 22, thus avoiding a flow of current in both directions of the coil K1 at the same time, which would cause false operation of the battery drain limitation device 10.

Figure 3:
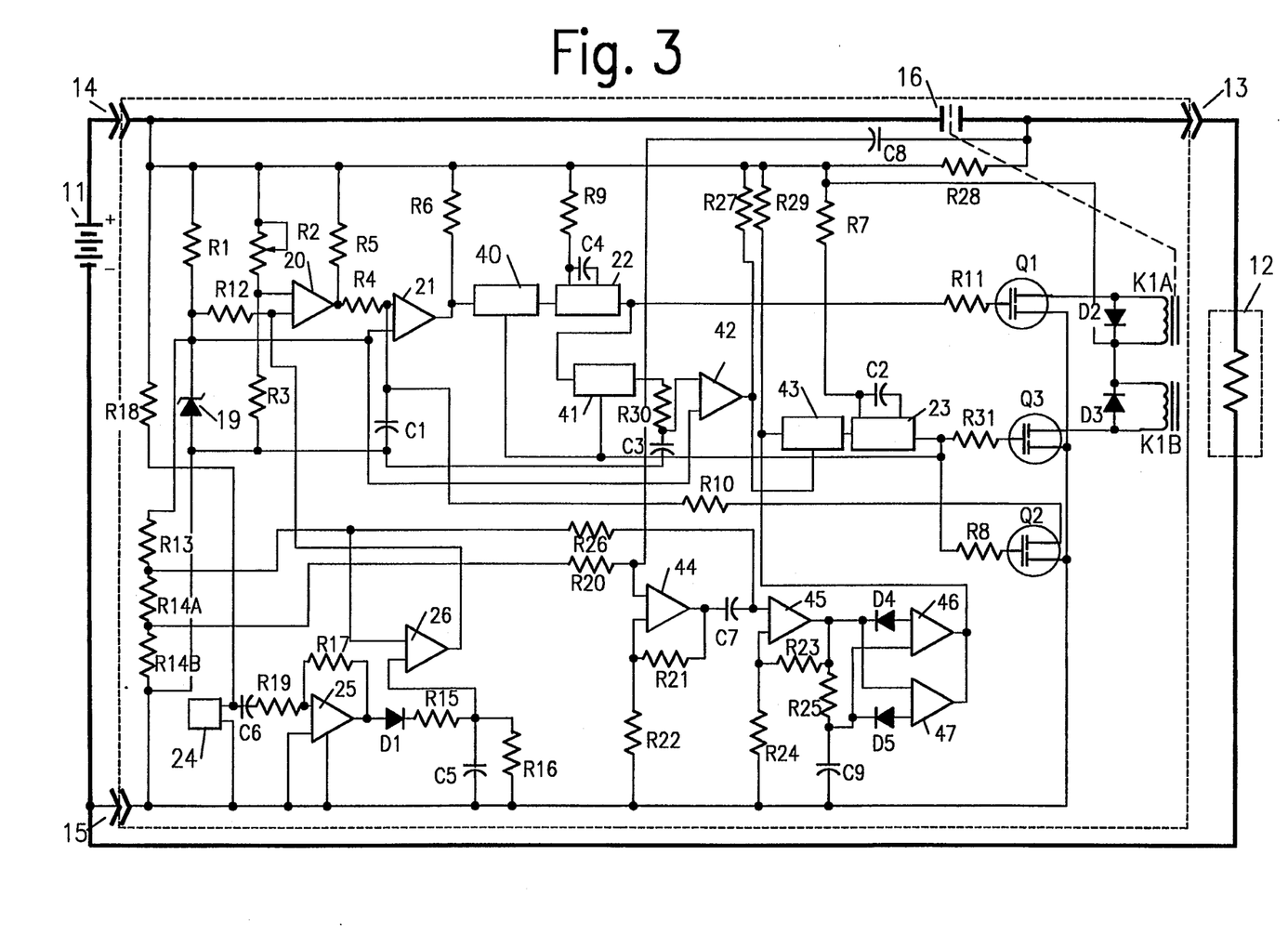
FIG. 3 is a schematic diagram of a modification of the embodiment of FIG. 2, showing a battery drain limitation circuit having an automatic resetting mechanism.

A third embodiment 10" of the invention is shown in FIG. 3, wherein like reference numerals and symbols designate the same or similar components as shown in FIG. 2. By way of example only, and not as limitations, the threshold voltage level for this third embodiment will be taken to be 11.5 volts, and the timing circuit comprised of charging capacitor $C_1$ and resistor $R_4$ (hereinafter "main timing circuit") has a time constant of about 5 minutes.

In the FIG. 3 embodiment, the reset circuitry is similar to that of the FIG. 2 embodiment in that it includes two functional relay coil segments (one for opening the relay contacts, and one for closing them), and a pair of diodes $D_2$ and $D_3$. The FIG. 2 embodiment, however, uses a single relay coil K1 with a center tap, whereas the FIG. 3 embodiment uses two coils K1A and K1B. Furthermore, instead of a manual reset switch, the FIG. 3 embodiment employs an electronic switch controlled by a differential amplifier and a delay circuit. In addition, since the use of a differential amplifier requires the circuit to receive its power directly from the battery, the FIG. 3 embodiment uses an isolation circuit to prevent false triggering of the disconnect circuit circuitry when the circuit is in the "off" state but is receiving power from the battery.

The delay circuit is responsive to the stable reference voltage and to the signal which triggers disconnection of battery 11 from the vehicle load 12. The stable reference voltage is supplied directly to the inverting input of a fourth comparator 42. When the first one-shot 22 is triggered, it outputs the voltage of the battery 11 for about 200 milliseconds to the gate of a first field effect transistor (FET) $Q_1$. The conduction of the first FET $Q_1$ sends a current through the upper relay coil K1A for about 500 milliseconds, causing the relay contacts 16 to open, effectively disconnecting the battery 11 from the load 12.

The output of the first one-shot 22 also sets a first D-flip-flop 41, whose output then changes from zero to the voltage of the battery 11. This output signal is delayed through a second timing circuit, comprising a resistor $R_{30}$ and a capacitor $C_3$. The time constant of this circuit is set so that the voltage at the capacitor $C_3$, which is applied to the non-inverting input of the fourth comparator 42, does not reach the stable reference voltage until a period of time (hereinafter "load stabilization delay") after the first D-flip-flop 41 has been set. The load stabilization delay allows the resistance of the vehicle load 12 to stabilize after disconnection of the battery 11, preventing false triggering of the reset circuitry whose operation is described in detail below. By way of example only, and not as a limitation, the load stabilization delay will be taken to be approximately two seconds.

After the load stabilization delay, the voltage at the capacitor $C_3$ reaches and then exceeds the stable reference voltage, thereby causing the fourth comparator 42 to change state and output the voltage of the battery 11. This action sets the reset line of a second D-flip-flop 43 to high and enables the reset circuitry whose operation is described in detail below.

Reset means are provided for latching the relay contacts 16 in the closed position. In the embodiment shown in FIG. 3, the reset circuitry comprises a third FET $Q_3$, the lower relay coil K1B, diodes $D_2$ and $D_3$, and a vehicle load differential amplifier.

The differential amplifier operates as follows to restore battery power to the vehicle load. Even when the battery 11 is disconnected, a current path to the vehicle load 12 is provided through a resistor $R_{28}$, and the voltage drop across $R_{28}$ will be coupled to a first operational amplifier 44 by a capacitor $C_8$. This is the only current path to the vehicle load 12 when the battery 11 is disconnected, since all remaining circuitry of device 10" is connected directly to the battery 11.

If the resistance of the vehicle load 12 is constant, the output of the first operational amplifier 44 will be constant. However, if there is a change in the resistance of the vehicle load 12 (from turning on a dome light or from attempting to engage the starter motor), this change will be amplified by the first operational amplifier 44. The amplified change signal is coupled through a capacitor $C_7$ to a second operational amplifier 45, causing a large voltage swing in the output of the second operational amplifier 45. By way of example rather than as a limitation, the combination of the first and second operational amplifiers 44 and 45 provides a voltage gain of about 250,000.

The output of the second operational amplifier 45 is filtered and applied to the inputs of detection gates 46 and 47, respectively. Offset diodes $D_4$ and $D_5$ are inserted at inputs to detection gates 46 and 47, respectively, in such a manner that the detection gate 46 detects positive changes in the resistance of the vehicle load 12, while the detection gate 47 detects negative changes in the resistance of the vehicle load 12. The offset diodes $D_4$ and $D_5$ also prevent small oscillations or changes in resistance from triggering the detection gates 46 and 47. By way of example rather than as a limitation, the offset diodes $D_4$ and $D_5$ provide an offset voltage of 0.7 volts.

When the resistance of the vehicle load 12 is constant or changes within a deadband set by the offset diodes $D_4$ and $D_5$, the output of the detection gates 46 and 47 is the voltage of the battery 11. A change in resistance of the vehicle load 12, after amplification as described above, if outside the deadband set by the offset diodes $D_4$ and $D_5$, will set the output of the positive detection gate 46 or the negative detection gate 47 to zero, depending upon whether the change is positive or negative.

Note that even when the battery 11 is connected to the vehicle, changes in the resistance of the vehicle load 12 will cause the outputs of the detection gates 46 and 47 to toggle between zero and the voltage of the battery 11. This has no effect when the reset line of the second D-flip-flop 43 is set to zero by the output of the fourth comparator 42, since this zero signal effectively disables the second D-flip-flop 43 from responding to changes at its input. It is in this manner that the delay circuit controls operation of the reset circuitry. However, when the reset line of the second D-flip-flop 43 is set high by the output of the fourth comparator 42, a zero voltage at the output of either detection gate will trigger the second D-flip-flop 43, changing its output from zero volts to the voltage of the battery 11. This action in turn will trigger the second one-shot 23, generating an output to the gates of the second FET $Q_2$ and the third FET $Q_3$ through the resistors $R_8$ and $R_{31}$, respectively, turning on the second FET $Q_2$ and the third FET $Q_3$. The output of the second one-shot 23 also resets the first D-flip-flop 41, thereby resetting the delay circuit. The conduction of the second FET $Q_2$ shorts the capacitor $C_1$ to ground through a resistor $R_{10}$, resetting the main timing circuit.

In the embodiment of FIG. 2, the output of the main timing circuit (the output of the second comparator 21) is connected directly to the first one-shot 22. After a delay characteristic of the main timing circuit, a high signal out of the second comparator 21 triggers the first one-shot 22, and ultimately unlatches the relay contacts 16, thereby disconnecting the second comparator 21 from the battery 11. In the embodiment of FIG. 3, however, the second comparator 21 is connected directly to the battery 11 and remains active when the relay contacts are unlatched. Consequently, in the embodiment of FIG. 3, the output of the second comparator 21 is connected to an additional isolating element, namely, an isolating D-flip-flop 49, the output of which is, in turn, connected to the input of the first one-shot 22. After the delay period of the main timing circuit, the second comparator 21 changes state, and sets the output of the isolating D-flip-flop 49 to a high voltage that triggers the first one-shot 22. The isolating D-flip-flop 49 is reset by the output of the second one-shot 23, after the load stabilization delay, thus enabling further operation of the first one-shot 22 and the remainder of the disconnection circuitry. This approach prevents the first one-shot 22 in the FIG. 3 embodiment from triggering falsely when the circuitry is in the "off" state.

In normal operation of the device 10", a current path is provided across the battery 11 such that when the first FET $Q_1$ is "on", a current will flow through the upper coil K1A, opening the relay contacts 16. When third FET $Q_3$ is turned on, current flows through the lower coil K1B, causing the relay contacts 16 to latch in the closed position, thereby applying the voltage of the battery 11 to the vehicle load 12.

FIGS. 4 through 8 illustrate a novel latching relay 200, of a type that is advantageously used in any of the above-described circuits. The relay 200 comprises a substantially cylindrical body or housing 202, containing an annular front coil 204 and an annular rear coil 206, axially aligned in a tandem relationship, and axially separated by a tubular collar 208. The coils 204, 206, and the collar 208 are retained within the housing 202 by a front end plate 210 and a rear end plate 212. The front end plate 210 has a central aperture 214.

Figure 4:
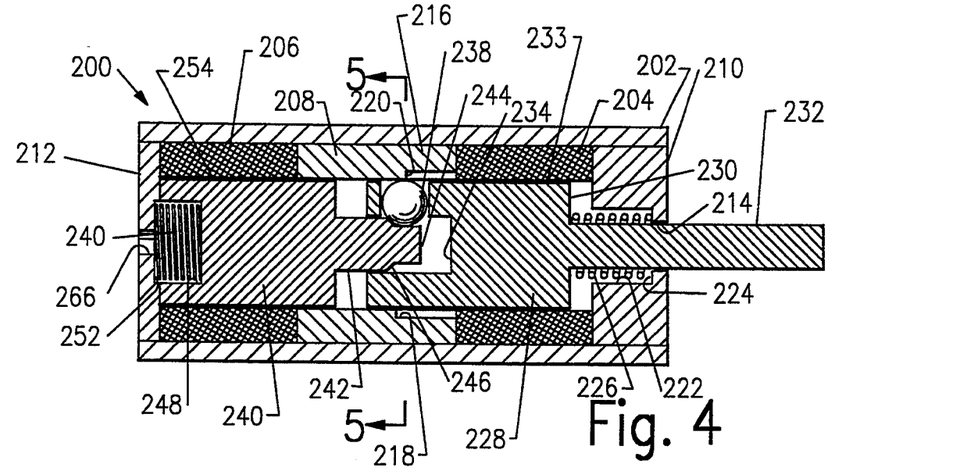
FIG. 4 is an axial cross-sectional view of a novel latching relay preferably used in the circuits of FIGS. 1, 2, and 3, showing the relay in its withdrawn or open position.

The collar 208 includes an integral front portion 216, proximate the front coil 204, with an enlarged internal diameter that defines an opening 218. A first internal annular shoulder 220 is thus formed at the juncture between the collar front portion 216 and the main portion of the collar 208.

The front end plate 210 is formed with a central internal bore 222 that communicates with the central aperture 214, but which has a larger diameter, thereby defining a second internal annular shoulder 224 where the bore 222 joins the aperture 214. The second shoulder 224 forms a first seat for a coil-type front biasing spring 226.

A front plunger 228 is slidably disposed within the interior of the front coil 204 and the collar 208. The front plunger 228 has an anterior surface 230, and extending forwardly from the anterior surface 230 is an elongate actuation rod or arm 232. The actuation arm 232 extends axially through the interior of the front biasing spring 226 and out through the aperture 214 in the front end plate 210. The juncture between the actuation arm 232 and the anterior surface 230 of the front plunger 228 forms a second seat for the front biasing spring 226. The cylindrical exterior wall surface of the front plunger 228 is advantageously covered with a first electrically insulating, low friction sleeve 233 that facilitates a sliding engagement between the front plunger 228, on the one hand, and the front coil 204 and the collar 208, on the other hand, as will be described below.

Figure 5:
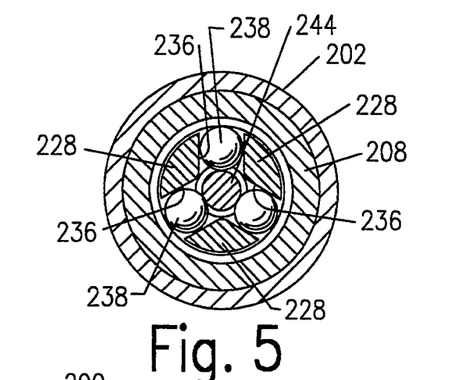
FIG. 5 is a cross-sectional view taken along line 5—5 of FIG. 4, with the latching balls of the invention shown in elevation.

The rear or posterior portion of the front plunger 228 is formed with an axial cavity 234. The cavity 234 communicates with a plurality of radially-extending pockets 236 that open to the exterior of the front plunger 228. In each of the pockets 236 is seated a latching ball 238. In the preferred embodiment shown in the drawings, there are three equidistantly-spaced pockets 236, and thus there are three latching balls 238 disposed circumferentially around the cavity 234. The number of pockets and latching balls may be varied, however, according to the dictates of the particular application.

A rear plunger 240 is slidably disposed within the interior of the rear coil 206 and the collar 208. Extending forwardly from the anterior end of the rear plunger 240 is an axial extension member having a large diameter portion 242 and a reduced diameter tip portion 244 joined by a frustoconical camming surface 246. The posterior end of the rear plunger 240 is formed with a relatively deep, circular, central recess 248 that forms a first seat for a coil-type rear biasing spring 250. A second seat for the rear biasing spring 250 is defined by a relatively shallow circular recess 252 formed in the interior wall surface of the rear end plate 212. The cylindrical exterior wall surface of the rear plunger 240 is advantageously covered with a second electrically insulating, low friction sleeve 254 that facilitates a sliding engagement between the rear plunger 240, on the one hand, and the rear coil 206 and the collar 208, on the other hand, as will be described below.

As mentioned above, the front plunger 228 and the rear plunger 240 are axially slidable within the housing 202. The front plunger 228 is journaled by the annular surface surrounding the aperture 214 in the front end plate 210, through which the actuation arm 232 extends, by the interior surface of the front coil 204, and by the interior wall surface of the main portion of the collar 208. The rear plunger 240 is journaled by the interior surfaces of the collar 208 and the rear coil 206. The two plungers are thus axially movable relative to each other, that is, toward and away from each other within the housing 202. The front plunger 228 is biased rearward, toward the rear plunger 240, by the front biasing spring 226, while the rear plunger 240 is biased toward the front plunger 228 by the rear biasing spring 250. For reasons to be made clear below, the spring constant of the front biasing spring 226 is greater than that of the rear biasing spring 250.

The operation of the latching relay 200 may now be easily understood. FIGS. 4 and 5 show the relay 200 in its withdrawn or open position, in which the actuation arm 232 is at its point of minimum extension through the aperture 214 in the front end plate 210. In the open position, both plungers are at the rearward extremes of their ranges of motion, with the rear biasing spring 250 compressed, and the front biasing spring 226 relaxed. In this position, the extension member on the anterior end of the rear plunger 240 is partially withdrawn from the cavity 234 in the posterior end of the front plunger 228, so that only the reduced diameter tip portion 244 and the frustoconical camming surface 246 are within the cavity. The latching balls 238 are at their radially inward extreme of travel within the pockets 236, resting on the camming surface 246, and restrained from moving radially outwardly by the interior surface of the main portion of the collar 208. With the latching balls 238 thus captured between the camming surface 246 and the collar 208, the rear plunger 240 is restrained by the latching balls 238 from moving forwardly toward the front plunger 228.

Figure 6:
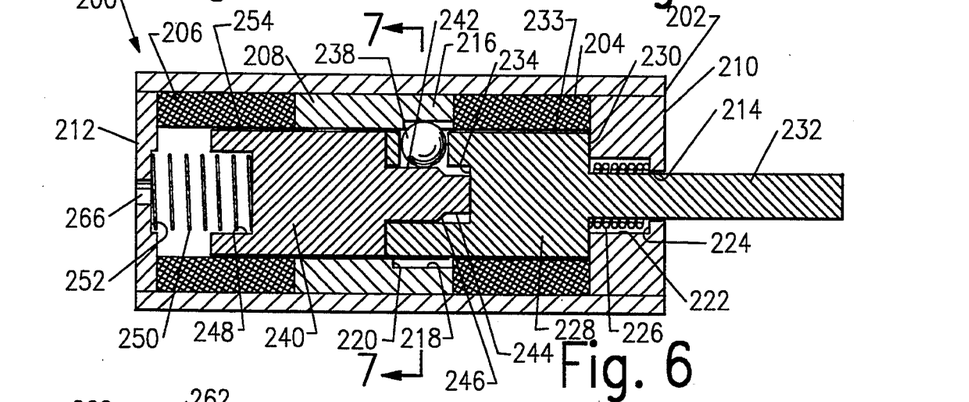
FIG. 6 is a view similar to that of FIG. 3, but showing the relay in its extended or closed position.
Figure 7:
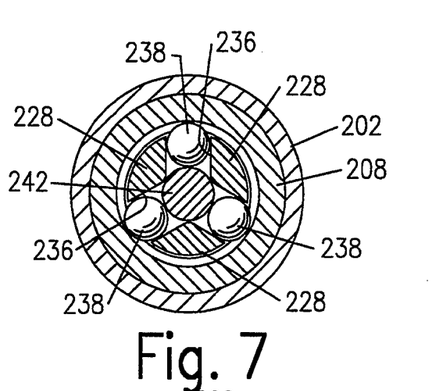
FIG. 7 is a cross-sectional view taken along line 7—7 of FIG. 6, with the latching balls shown in elevation.

The movement of the relay to its extended or closed position is illustrated in FIGS. 6 and 7. Energizing the front coil 204 by passing an electrical current through it draws the front plunger 228 forward toward the front end plate 210, against the bias of the front biasing spring 226. The pockets 236 containing the latching balls 238 are thus moved forward until they oppose the enlarged-diameter opening 218 in the front portion of the collar 208. The latching balls 238 are now free to move radially outwardly, thereby allowing the rear plunger 240, biased toward the front plunger 228 by the rear biasing spring 250, to move forward, so that its axial extension member is drawn fully into the cavity 234 in the posterior end of the front plunger 228. The forward motion of the rear plunger 240 causes the latching balls 238 to ride up the camming surface 246 onto the large diameter portion 242 of the axial extension member, thereby forcing the latching balls 238 radially outward, and capturing them between the large diameter portion 242 of the extension member and the forward portion 216 of the collar 208. In this position, the internal shoulder 220 provides a detent that engages the latching balls 238, thereby restraining the front plunger from rearward movement. Thus, the front plunger 228 is locked or "latched" in its extended position, with the actuation arm 232 at its point of maximum extension through the aperture 214 in the front end plate 210.

To restore the relay 200 to its withdrawn or open position, the rear coil 206 is energized with an electrical current, causing the rear plunger 240 to move rearward, against the bias of the rear bias spring 250, away from the front plunger 228 and toward the rear end plate 212. The large diameter portion 242 of the axial extension of the rear plunger 240 is thus withdrawn from the cavity 234 in the posterior end of the front plunger 228, thereby allowing the latching balls 238 to drop radially inward in the pockets 236 until they once again seat on the reduced diameter tip portion 244 of the extension. With the latching balls 238 now out of engagement with the internal shoulder 220 of the collar 208, the front plunger 228 is unlatched. The front biasing spring 226, having a greater spring constant than that of the rear biasing spring 250, pushes the front plunger 228 back toward the rear plunger 240, i.e., back to the position illustrated in FIGS. 4 and 5.

Figure 8:
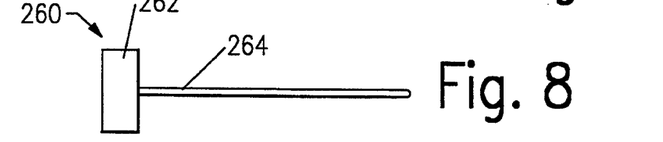
FIG. 8 is an elevational view of a manual actuation rod for use with the relay shown in FIGS. 4 through 7.

It may be desirable to move the relay 200 manually from its open (withdrawn) position to its closed (extended) position. For this purpose, a manual actuation tool 260, shown in FIG. 8, is provided. The tool 260 includes a gripping portion 262 and an elongate actuation rod 264 extending from the gripping portion 262. The free end of the rod 264 is inserted into a central aperture 266 in the rear end plate 212 of the relay 200, from which it is extended into the central recess 248 in the posterior end of the rear plunger 240. With the rod 264 thus inserted, the tool 260 can be manually pushed against the rear plunger 240 to push the rear plunger forward into engagement with the posterior end of the front plunger 228. The pushing is continued until the two plungers assume the positions shown in FIGS. 6 and 7, which is the latched, closed (extended) position. Movement of the relay back to its open (withdrawn) position would then be accomplished by energizing the rear coil 206, as described above.

The relay 200 may be employed in any of the circuits described above and illustrated in FIGS. 1, 2, and 3. Most advantageously, the relay 200 can be employed in the circuit of FIG. 3, wherein the lower coil K1B would correspond to the front coil 204 shown in FIGS. 4 and 6, and the upper coil K1A would correspond to the the rear coil 206 of FIGS. 4 and 6. The actuation arm 232 would then be employed, with a suitable mechanical linkage (not shown), to close the contacts 16 when the arm 232 is in its extended position, and to open the contacts when the arm 232 is in its withdrawn position.

While the invention has been described in terms of several preferred embodiments, those skilled in the art will recognize that the invention can be practiced with modifications that are within the spirit and scope of the invention as defined in the claims that follow.

What is claimed is:

1. In an engine powered vehicle or equipment having a battery operated electric starter motor and other electrical accessories, said battery having a threshold voltage level below which there may not be enough energy in said battery to operate said electric starter motor to start said engine, a battery drain limitation device, comprising:

a first detection means for determining a low voltage condition on said battery, said low voltage condition being a battery voltage at or below said threshold voltage level;

a second detection means for determining whether said engine is running;

interrupting means, responsive to said first and second detection means, for disconnecting the flow of current from said battery when said low voltage condition is detected and when said engine is not running;

reset means for reconnecting the flow of current from said battery to said starter motor and said accessories; and means for guarding against inadvertent failure of a human operator to reactivate said battery drain limitation device following activation of said reset means, said guarding means further comprising means for reactivating said battery drain limitation device upon activation of said reset means and means for delaying operation of said interrupting means for a preset period of time, said preset period being sufficient to allow starting said engine said guarding means being usable to operate said accessories in an emergency for said preset period of time.

2. The device of claim 1, wherein said battery limitation device is connected directly to said battery between said battery and all loads obtaining power from said battery.

3. The device of claim 1, wherein said first detection means comprises means for setting a stable reference voltage, means for measuring the voltage of said battery relative to said threshold voltage level, said measuring means having a first output voltage, said first output voltage being equal to said stable reference voltage when said battery voltage falls to said threshold level, and first voltage comparing means for determining when said first output voltage is equal to said stable reference voltage.

4. The device of claim 3, wherein said setting means comprises a back-biased Zener diode, a first and a second output and an isolating resistor, said Zener diode having an anode and a cathode, said anode being connected to ground, said Zener diode also having a breakdown voltage equal to said stable reference voltage, said first output being connected directly to said cathode and said second output being isolated from said cathode by said isolating resistor.

5. The device of claim 2, wherein said measuring means comprises a voltage divider across said battery consisting of a variable and a fixed resistor in series, said first output voltage of said measuring means being at a junction between said variable and said fixed resistors, said first output voltage being a present fraction of said battery voltage.

6. The device of claim 3, wherein said first voltage comparing means comprises first and second inputs and an output, said first voltage comparing means switching its output from low to high when said measuring means outputs said threshold reference voltage to said first input while said stable reference voltage is being applied to said second input via an isolating resistor.

7. The device of claim 6, wherein said interrupting means comprises timing means, first electronic switching means, and relay means, wherein said timing means comprises a charging resistor, a timing capacitor and an output, said charging resistor being connected to the output of said first voltage comparing means, said timing capacitor being connected in series with said charging resistor from the output of said first voltage comparing means to ground, and said output being the junction between said charging resistor and said timing capacitor, wherein said first electronic switching means comprises a second voltage comparing means, having first and second inputs and an output, first triggering means, and a first electronic switch, said first input being connected to said output of said timing means and said second input being connected to said stable reference voltage, said output switching state when the output of said timing means exceeds said stable reference voltage, said first triggering means having an input and an output, said input being connected to the output of said second voltage comparing means, wherein said first triggering means, in response to the switched output state of said second voltage comparing means, outputs a signal which closes said first electronic switch, said first electronic switch thereby connecting a circuit from ground to said relay means, wherein said relay means comprises a relay coil, contacts and a positive latching means, said relay coil having first and second ends and being activated to unlatch said latching means and open said contacts when said first electronic switch closes.

8. The device of claim 6, wherein said second detection means comprises means for setting a derived stable voltage, means for generating a noise reference voltage, said noise reference voltage being responsive to the operation of said engine, and a third voltage comparing means, said third voltage comparing means having a first and a second input and an output, said output being connected to the second input of said first voltage comparing means, wherein said noise generating means comprises a microphone, an amplifier, voltage smoothing means, said microphone generating a noise signal responsive to the operation of said engine, said noise signal being coupled through a capacitor to said amplifier, said amplifier having an output which is rectified through said voltage smoothing means, said voltage smoothing means having an output reflecting the decibel level of said noise signal, said voltage smoothing output being connected to the second input of said third voltage comparing means, wherein said derived stable voltage setting means comprises a voltage divider and a derived stable voltage output, said voltage divider comprising two resistors in series connected between said stable reference voltage and ground, said derived stable voltage output being taken from a junction of said two resistors and being a fraction of said stable reference voltage, said fraction being selected so that when said engine noise is approximately 75 decibels said derived stable voltage is equal to the output voltage of said voltage smoothing means, wherein said third voltage comparing means switches its output state from high to low, thereby preventing said first voltage comparing means from switching states when said battery voltage falls to said threshold level.

9. The device of claim 7, wherein said reset means comprises means for discharging said timing capacitor and means for reactivating the circuit.

10. The device of claim 9, wherein said discharge means further comprises a second triggering means and a second electronic switch, wherein said second triggering means has an input and an output, said input being connected to the output of said second voltage comparing means, wherein said second triggering means, in response to the switched output state of said second voltage comparing means, outputs a signal which closes said second electronic switch, said second electronic switch thereby connecting a circuit from ground to the output of said timing means, through a discharge resistor, thereby discharging said timing capacitor.

11. The device of claim 9, wherein said reactivating means comprises a manually operable reset mechanism, means, responsive to the pressing of said reset mechanism, for momentarily activating said relay coil to latch said latching means, and means for dissipating a reverse voltage produced by said relay coil when said reset mechanism is released, wherein said activating means comprises a switch, having a first and a second pole, each said pole being connected to an operating contact and a momentary reset contact, said first pole being connected to the first end of said relay coil and said second pole being connected to second end of said relay coil, said first reset contact being connected to a positive terminal of said battery and said second reset contact being connected to ground, such that when said switch is in a reset position current through said relay coil latches said relay contacts in a closed position, said first operating contact being connected to ground through said first electronic switch and second operating contact being connected to the positive terminal at the opposite side of said contacts from said battery, wherein said dissipating means comprises a diode having an anode and a cathode, said anode being connected to ground and said cathode being connected to said first operating contact.

12. The device of claim 11, wherein said contacts comprise a battery-side contact and a load-side contact, wherein said first triggering means receives its power at said battery-side contact, and wherein said first detection means, said second detection means, said timing means, said second voltage comparing means, and said discharge means each receive their power at said load-side contact.

13. The device of claim 9, wherein said reactivating means comprises a manually operable reset mechanism, means, responsive to the pressing of said reset mechanism, for momentarily activating said relay coil to latch said latching means, and means for dissipating the reverse voltage produced by said relay coil when said reset mechanism is released, wherein said reset mechanism comprises a momentary switch having first and second contacts, said second contact being connected to ground, wherein said activating means comprises a center tap on said relay coil, said center tap being connected to a positive terminal of said battery, a connection between said first end of said relay coil to said first electronic switch, and a connection between said second end of said relay coil to said first contact of said reset mechanism, such that when said reset mechanism is pushed current from said battery flows through said center tap to said second end of said relay coil through said button contacts to ground, thereby latching said relay contacts in a closed position, wherein said dissipating means comprises first and second diodes, each having an anode and cathode, both of said cathodes being connected to said center tap, said first anode being connected to said first end of said relay coil, and said second anode being connected to said second end of said relay coil.

14. The device of claim 13, wherein said contacts comprise a battery-side contact and a load-side contact, wherein said first triggering means receives its power at said battery-side contact, and wherein said first detection means, said second detection means, said timing means, said second voltage comparing means, and said discharge means each receive their power at said load-side contact.

15. A device for limiting current drain from a battery connected to a starter motor and electrical accessories in an engine powered vehicle or the like, the device comprising:

low voltage detection means for detecting a battery voltage lower than a threshold voltage level;

interrupting means, responsive to the low voltage detection means, for disconnecting the flow of current from the battery to the starter motor and accessories when the battery voltage is below the threshold voltage;

reset means for reconnecting the flow of current from said battery to said starter motor and said accessories; and means for guarding against inadvertent failure of a human operator to reactivate said battery drain limitation device following activation of said reset means, said guarding means further comprising means for reactivating said battery drain limitation device upon activation of said reset means and means for delaying operation of said interrupting means for a preset period of time, said preset period being sufficient to allow starting said engine, said guarding means being usable to operate said accessories in an emergency for said preset period of time.

16. The device of claim 15, further comprising sound-responsive means for detecting whether the engine is running, wherein said interrupting means are responsive to the low voltage detection means and the sound-responsive means to disconnect the flow of current when both (a) the battery voltage is below the threshold voltage and (b) the engine is not running.

17. The device of claim 15, wherein the low voltage detection means comprises:

first means for setting the threshold voltage level;

second means for setting a first reference voltage; and third means for measuring the voltage of the battery relative to the threshold voltage level, wherein the third means has an output voltage that is substantially equal to the reference voltage when the battery voltage falls to the threshold voltage level.

18. The device of claim 17, wherein the second means comprises:

a back-biased Zener diode with a breakdown voltage that is substantially equal to the reference voltage; and first and second output means connected to the cathode of the Zener diode, the second output means being resistively isolated from the cathode.

19. The device of claim 15, wherein the third means comprises a voltage divider across the battery, wherein the voltage divider comprises:

a variable resistor and a fixed resistor connected in series; and a junction between the variable resistor and the fixed resistor at which the output voltage of the third means is applied.

20. In an engine powered vehicle or equipment having a battery operated electric starter motor and other electrical accessories, a battery drain limitation device, comprising:

detection means for determining the existence of a battery drain condition;

interrupting means, responsive to said detection means, for disconnecting the flow of current from said battery when a battery drain condition is detected;

reset means for reconnecting the flow of current from said battery to said starter motor and said accessories; and means for guarding against inadvertent failure of a human operator to reactivate said battery drain limitation device following activation of said reset means, said guarding means further comprising means for reactivating said battery drain limitation device upon activation of said reset means and means for delaying operation of said interrupting means for a preset period of time, said preset period being sufficient to allow starting said engine, said guarding means being usable to operate said accessories in an emergency for said preset period of time.

21. In an engine powered vehicle or equipment having a battery operated electric starter motor and other electrical accessories, a battery drain limitation device, comprising:

detection means for determining the existence of a battery drain condition;

interrupting means, responsive to said detection means, for disconnecting the flow of current from said battery when a battery drain condition is detected, wherein said disconnection protects said battery against current drain from said starter motor and accessories;

reset means for reconnecting the flow of current from said battery to said starter motor and said accessories;

delay means for pausing a preset amount of time between detection of said battery drain condition and operation of said interrupting means, said preset amount of time being sufficient to allow starting of said engine; and reactivation means for reconnecting said battery drain limitation device upon activation of said reset means, said reactivation means in combination with said delay means being usable to operate said accessories in an emergency, said reactivation means providing protection against draining of said battery by inadvertent failure of a human operator to reconnect said battery drain limitation device following activation of said reset means.

22. The device of claim 21, wherein said detection means comprises means for determining whether enough power remains in said battery to start said engine, said determining means not being operable when said engine is running.

23. The device of claim 22, wherein said determining means comprises:

means for setting a threshold voltage level, said threshold voltage level being a battery voltage below which there may not be enough energy in said battery to operate said electric starter motor to start said engine; and means for measuring the voltage of the battery relative to the threshold voltage level, said measuring means having an output that changes state when the battery voltage falls to the threshold voltage level.

24. The device of claim 6, wherein said interrupting means comprises timing means, first electronic switching means, and relay means, wherein said timing means comprises a charging resistor, a timing capacitor and an output, said charging resistor being connected to the output of said first voltage comparing means, said timing capacitor being connected in series with said charging resistor from the output of said first voltage comparing means to ground, and said output being the junction between said charging resistor and said timing capacitor, wherein said first electronic switching means comprises a second voltage comparing means, having first and second inputs and an output, first triggering means, means for isolating said output of said second voltage comparing means from said first triggering means, and a first electronic switch, said first input being connected to said output of said timing means and said second input being connected to said stable reference voltage, said output switching state when the output of said timing means exceeds said stable reference voltage, said isolating means having an input and an output and a reset, said input being connected to said output of said second voltage comparing means, said first triggering means having an input and an output, said input being connected to the output of said isolating means, wherein said isolating means, in response to the switched output state of said second voltage comparing means, in turn switches its output to a high state, wherein said first triggering means, in response to the switched output state of said isolating means, outputs a signal which closes said first electronic switch, said first electronic switch thereby connecting a circuit from ground to said relay means, wherein said relay means comprise first and second relay coils, contacts and a positive latching means, said relay coils each having upper and lower ends, said first relay coil being activated to unlatch said latching means and open said contacts when said first electronic switch closes, said second relay coil being activated to latch said latching means and close said contacts responsive to said reset means, wherein said reset means comprises means for discharging said timing capacitor, means for resetting said isolating means, and means for reactivating the circuit.

25. The device of claim 24, wherein said reactivating means comprises means for detecting changes in the resistance of said vehicle electrical accessories, means, responsive to said detection means, for momentarily activating said first relay coil to latch said latching means, and means for dissipating the reverse voltage produced by said relay coil when said momentary activation means has ceased activating, wherein said dissipating means comprises first and second diodes, each having an anode and cathode, said first cathode being connected to said lower end of said first relay coil and said second cathode being connected to the upper end of said second relay coil, both of said cathodes being connected together, said first anode being connected to said upper end of said first relay coil, and said second anode being connected to said lower end of said second relay coil.

26. The device of claim 25, wherein said detection means comprises means for converting said resistance changes to voltage changes, means for amplifying said voltage changes, and means for outputting a zero voltage signal whenever said voltage changes (whether positive or negative) are above a threshold level, wherein said momentary activation means comprises latching triggering means, responsive to said outputting means, for latching said latching means, and means, responsive to said first triggering means, for delaying the operation of said latching triggering means for a stabilization period immediately following disconnection of said battery from said electrical accessories.

27. The device of claim 26, wherein said conversion means comprises a resistor and capacitor, said resistor having a first and a second end and said capacitor having a first and a second end, said first end of said resistor and said first end of said capacitor being connected to said electrical accessories, said second end of said resistor being connected to said battery, wherein said amplifying means comprises one or more cascaded operational amplifier stages having as input said second end of said capacitor and having an amplified output, wherein said zero voltage outputting means comprises a positive detection gate having said amplified output as input and outputting a zero voltage if said amplified output is positive and above said threshold level, and a negative detection gate having said amplified output as input and outputting a zero voltage if said amplified output is negative and has an absolute value above said threshold level, wherein said latching triggering means comprises a first bistable switching means, a third triggering means, and a third electronic switch, said first bistable switching means having an input and an output and a reset, said input being provided by the output of said zero voltage outputting means, said third triggering means having an input and an output, said input being connected to the output of said first bistable switching means, and said output being connected through a resistor to said third electronic switch, wherein said third triggering means, in response to the switched output state of said first bistable switching means, outputs a signal which resets said isolating means and closes said third electronic switch, said third electronic switch thereby closing a latching circuit which latches said latching means, wherein said latching circuit comprises a connection between said upper end of said second relay coil to a positive terminal of said battery, a connection between said lower end of said second relay coil to said third electronic switch, such that when said third electronic switch is closed current from said battery flows through said second relay coil and through said third electronic switch to ground, thereby latching said relay contacts in a closed position, wherein said delaying means comprises a second bistable switching means, a second timing means, and a third voltage comparing means, said second bistable switching means having an input and an output and a reset, said input being connected to the output of said first triggering means and said reset being connected to the output of said third triggering means, said second timing means comprising a second charging resistor, a second timing capacitor and an output, said second charging resistor being connected to the output of said second bistable switching means, said second timing capacitor being connected in series with said second charging resistor from the output of said second bistable switching means to ground, and said output being the junction between said second charging resistor and said second timing capacitor, said third voltage comparing means having first and second inputs and an output, said first input being connected to said output of said second timing means and said second input being connected to said stable reference voltage, said output being connected to said reset of said first bistable switching means and switching its output from low to high when the output of said second timing means exceeds said stable reference voltage.

28. The latching relay of claim 27, wherein the first biasing means includes a front coil spring seated between the front end of the housing and the anterior surface of the front plunger.

29. The latching relay of claim 27, wherein the rear plunger includes an anterior surface from which the extension member extends, and a posterior surface, and wherein the second biasing means includes a rear coil spring seated between the rear end of the housing and the posterior surface of the rear plunger.

30. The latching relay of claim 27, wherein the rear end of the housing includes a rear end plate having an aperture dimensioned and located with respect to the rear plunger so as to allow the engagement of the rear plunger by manual actuation means dimensioned to be inserted into the aperture for engagement with the rear plunger.

31. The latching relay of claim 27, wherein the first biasing means includes a front coil spring seated between the front end of the housing and the anterior surface of the front plunger, wherein the rear plunger includes an anterior surface from which the extension member extends, and a posterior surface, and wherein the second biasing means includes a rear coil spring seated between the rear end of the housing and the posterior surface of the rear plunger.

32. The latching relay of claim 31, wherein the spring constant of the front coil spring is greater than the spring constant of the rear coil spring.

33. A latching relay, comprising:
a housing containing front and rear annular coils, axially separated by a tubular collar, the housing including front and rear end plates, the collar having a front portion proximate the front coil and a main portion integral with the front portion, the front portion defining an opening with an internal diameter that is larger than that of the main portion, whereby an internal annular shoulder is formed at the juncture between the front and main portions;
a front plunger slidably disposed between first and second axial positions within the interior of the front coil and the collar, the front plunger including an anterior surface bearing an actuation member that is extensible through an aperture in the front end plate, and a posterior portion defining an axial cavity;

a rear plunger slidably disposed within the interior of the rear coil and the collar, the rear plunger including an extension member dimensioned and located so as to be insertable into the cavity and axially movable between first and second axial positions therein;

first biasing means for biasing the front plunger away from the front end plate and toward the rear plunger;

second biasing means for biasing the rear plunger away from the rear end plate and toward the front plunger; and latching means, carried in the front plunger so as to be radially movable with respect to the cavity between an inner radial position in which the latching means engage the main portion of the collar, and an outer radial position in which the latching means engage the front portion of the collar and the annular shoulder therein;

wherein the extension member includes camming means for moving the latching means to the outer radial position when the front plunger is moved toward the front end plate against the force of the first biasing means by the energization of the front coil and the rear plunger is moved by the second biasing means to move the extension member from its first position to its second position within the cavity; and wherein the latching means move to the inner radial position as the extension member is moved from its second position to its first position when the rear plunger is moved toward the rear end plate against the force of the second biasing means by the energization of the rear coil and the front plunger is moved toward the rear plunger by the first biasing means.

34. The relay of claim 33, wherein the front plunger includes a plurality of radially-extending pockets communicating with the axial cavity, and wherein the latching means includes a latching ball disposed in each of the pockets for radially movement therein between the inner radial position and outer radial position.

35. The latching relay of claim 33, wherein the first biasing means includes a front coil spring seated between the front end plate and the anterior surface of the front plunger.

36. The latching relay of claim 33, wherein the rear plunger includes an anterior surface from which the extension member extends, and a posterior surface, and wherein the second biasing means includes a rear coil spring seated between the rear end plate and the posterior surface of the rear plunger.

37. The latching relay of claim 33, wherein the rear end plate includes an aperture dimensioned and located with respect to the rear plunger so as to allow the engagement of the rear plunger by manual actuation means dimensioned to be inserted into the aperture for engagement with the rear plunger.

38. The latching relay of claim 33, wherein the first biasing means includes a front coil spring seated between the front end plate and the interior surface of the front plunger, wherein the rear plunger includes an anterior surface from which the extension member extends, and a posterior surface, and wherein the second biasing means includes a rear coil spring seated between the rear end plate and the posterior surface of the rear plunger.

39. The latching relay of claim 38, wherein the spring constant of the front coil spring is greater than the spring constant of the rear coil spring.

40. The relay of claim 34, wherein the extension member includes a large diameter portion and a reduced diameter tip portion, with the camming means located between the large diameter portion and the tip portion.

41. The relay of claim 40, wherein the camming means includes a frustoconical surface on the extension member between the large diameter portion and the tip portion.

42. A latching relay, comprising:
a tubular housing having a front end and a rear end;
front and rear annular coils axially disposed in the housing, and axially separated by a tubular collar having an interior surface;
means forming a detent on the interior surface of the collar;
a front plunger slidably disposed between first and second axial positions within the interior of the front coil and the collar, the front plunger including an anterior surface bearing an elongate actuation arm extensible through the front end of the housing, and a posterior portion defining an axial cavity;
a rear plunger slidably disposed within the interior of the rear coil and the collar, the rear plunger including an extension member dimensioned and located so as to be insertable into the cavity and axially movable between first and second axial positions therein;
first biasing means for biasing the front plunger away from the front end of the housing and toward the rear plunger;
second biasing means for biasing the rear plunger away from the rear end of the housing and toward the front plunger; and
latching means, carried in the front plunger so as to be radially movable with respect to the cavity between an inner radial position in which the latching means engage the interior surface of the collar at a point spaced from the detent thereon, and an outer radial position in which the latching means engage the interior surface of the collar at the detent thereon;
wherein the extension member includes camming means for moving the latching means to the outer radial position when the front plunger is moved toward the front end of the housing against the force of the first biasing means by the energization of the front coil and the rear plunger is moved by the second biasing means to move the extension member from its first position to its second position within the cavity; and
wherein the latching means move to the inner radial position as the extension member is moved from its second position to its first position when the rear plunger is moved toward the rear end of the housing against the force of the second biasing means by the energization of the rear coil and the front plunger is moved toward the rear plunger by the first biasing means.

43. The latching relay of claim 42, wherein the collar includes a front portion proximate the front coil and a main portion integral with the front portion, the front portion having a larger internal diameter than the rear portion, wherein the detent is defined by an internal annular shoulder at the juncture between the front and rear portions.

44. The relay of claim 42, wherein the front plunger includes a plurality of radially-extending pockets communicating with the axial cavity, and wherein the latching means includes a latching ball disposed in each of the pockets for radially movement therein between the inner radial position and outer radial position.

45. The relay of claim 44, wherein the extension member includes a large diameter portion and a reduced diameter tip portion, with the camming means located between the large diameter portion and the tip portion.

46. The relay of claim 45, wherein the camming means includes a frustoconical surface on the extension member between the large diameter portion and the tip portion.

47. In an engine powered vehicle or equipment having a battery operated electric starter motor and other electrical accessories, said battery having a threshold voltage level below which there may not be enough energy in said battery to operate said electric starter motor to start said engine, a battery drain limitation device, comprising:
  a first detection means for determining a low voltage condition on said battery, said low voltage condition being a battery voltage at or below said threshold voltage level;
  a second detection means for determining whether said engine is running;
  interrupting means, responsive to said first and second detection means, for disconnecting the flow of current from said battery when said low voltage condition is detected and when said engine is not running;
  reset means for reconnecting the flow of current from said battery to said starter motor and said accessories; and
  means for guarding against inadvertent failure of a human operator to reactivate said battery drain limitation device following activation of said reset means, said guarding means further comprising means for reactivating said battery drain limitation device upon activation of said reset means and means for delaying operation of said interrupting means for a preset-period of time, said preset period being sufficient to allow starting said engine, said guarding means being usable to operate said accessories in an emergency for said preset period of time;
  wherein said first detection means comprises means for setting a stable reference voltage, means for measuring the voltage of said battery relative to said threshold voltage level, said measuring means having a first output voltage, said first output voltage being equal to said stable reference voltage when said battery voltage falls to said threshold level, and first voltage comparing means for determining when said first output voltage is equal to said stable reference voltage,
  wherein said first voltage comparing means comprises first and second inputs and an output, said first voltage comparing means switching its output from low to high when said measuring means outputs said threshold reference voltage to said first input while said stable reference voltage is being applied to said second input via said isolating resistor,
  wherein said interrupting means comprises timing means, first electronic switching means, and relay means,
  wherein said timing means comprises a charging resistor, a timing capacitor and an output, said charging resistor being connected to the output of said first voltage comparing means, said timing capacitor being connected in series with said charging resistor from the output of said first voltage comparing means to ground, and said output being the junction between said charging resistor and said timing capacitor,
  wherein said first electronic switching means comprises a second voltage comparing means, having first and second inputs and an output, first triggering means, means for isolating said output of said second voltage comparing means from said first triggering means, and a first electronic switch, said first input being connected to said output of said timing means and said second input being connected to said stable reference voltage, said output switching state when the output of said timing means exceeds said stable reference voltage, said isolating means having an input and an output and a reset, said input being connected to said output of said second voltage comparing means, said first triggering means having an input and an output, said input being connected to the output of said isolating means, wherein said isolating means, in response to the switched output state of said second voltage comparing means, in turn switches its output to a high state, wherein said first triggering means, in response to the switched output state of said isolating means, outputs a signal which closes said first electronic switch, said first electronic switch thereby connecting a circuit from ground to said relay means,
  wherein said relay means comprise first and second relay coils, contacts and a positive latching means, said relay coils each having upper and lower ends, said first relay coil being activated to unlatch said latching means and open said contacts when said first electronic switch closes, said second relay coil being activated to latch said latching means and close said contacts responsive to said reset means,
  wherein said reset means comprises means for discharging said timing capacitor and means for resetting said isolating means.

48. The device of claim 47, wherein said reactivating means comprises means for detecting changes in the resistance of said vehicle electrical accessories, means, responsive to said detection means, for momentarily activating said relay coil to latch said latching means, and means for dissipating the reverse voltage produced by said relay coil when said reset mechanism has ceased activating,
  wherein said dissipating means comprises first and second diodes, each having an anode and cathode, said first cathode being connected to said lower end of said first relay coil and said second cathode being connected to the upper end of said second relay coil, both of said cathodes being connected together, said first anode being connected to said upper end of said first relay coil, and said second anode being connected to said lower end of said relay coil.

49. The device of claim 48, wherein said detection means comprises means for converting said resistance changes to voltage changes, means for amplifying said voltage changes, and means for outputting a zero voltage signal whenever said voltage changes (whether positive or negative) are above a threshold level, wherein said momentary activation means comprises latching triggering means, responsive to said outputting means, for latching said latching means, and means, responsive to said first triggering means, for delaying the operation of said latching triggering means for a stabilization period immediately following disconnection of said battery from said electrical accessories.

50. The device of claim 49, wherein said conversion means comprises a resistor and capacitor, said resistor having a first and a second end and said capacitor having a first and a second end, said first end of said resistor and said first end of said capacitor being connected to said electrical accessories, said second end of said resistor being connected to said battery, wherein said amplifying means comprises one or more cascaded operational amplifier stages having as input said second end of said capacitor and having an amplified output, wherein said zero voltage outputting means comprises a positive detection gate having said amplified output as input and outputting a zero voltage if said amplified output is positive and above said threshold level, and a negative detection gate having said amplified output as input and outputting a zero voltage if said amplified output is negative and has an absolute value above said threshold level, wherein said latching triggering means comprises a first bistable switching means, a third triggering means, and a third electronic switch, said first bistable switching means having an input and an output and a reset, said input being provided by the output of said zero voltage outputting means, said third triggering means having an input and an output, said input being connected to the output of said first bistable switching means, and said output being connected through a resistor to said third electronic switch, wherein said third triggering means, in response to the switched output state of said first bistable switching means, outputs a signal which resets said isolating means and closes said third electronic switch, said third electronic switch thereby closing a latching circuit which latches said latching means, wherein said latching circuit comprises a connection between said upper end of said second relay coil to a positive terminal of said battery, a connection between said lower end of said second relay coil to said third electronic switch, such that when said third electronic switch is closed current from said battery flows through said second relay coil and through said third electronic switch to ground, thereby latching said relay contacts in a closed position, wherein said delaying means comprises a second bistable switching means, a second timing means, and a third voltage comparing means, said second bistable switching means having an input and an output and a reset, said input being connected to the output of said first triggering means and said reset being connected to the output of said third triggering means, said second timing means comprising a second charging resistor, a second timing capacitor and an output, said second charging resistor being connected to the output of said second bistable switching means, said second timing capacitor being connected in series with said second charging resistor from the output of said second bistable switching means to ground, and said output being the junction between said second charging resistor and said second timing capacitor, said third voltage comparing means having first and second inputs and an output, said first input being connected to said output of said second timing means and said second input being connected to said stable reference voltage, said output being connected to said reset of said first bistable switching means and switching its output from low to high when the output of said timing means exceeds said stable reference voltage.

* * * * *

UNITED STATES PATENT AND TRADEMARK OFFICE
CERTIFICATE OF CORRECTION

PATENT NO. : 5,381,295

DATED : January 10, 1995

INVENTOR(S) : Larry Rund, et al.

It is certified that error appears in the above-identified patent and that said Letters Patent is hereby corrected as shown below:

Column 20, lines 27, 31, 37 and 44, "claim 27" should be --claim 42--.

Signed and Sealed this

Twenty-sixth Day of March, 1996

Attest:

BRUCE LEHMAN

Attesting Officer      *Commissioner of Patents and Trademarks*